Jan. 28, 1941. J. W. MERTENS, JR 2,230,042
TIRE GROOVING TOOL
Filed Feb. 8, 1940
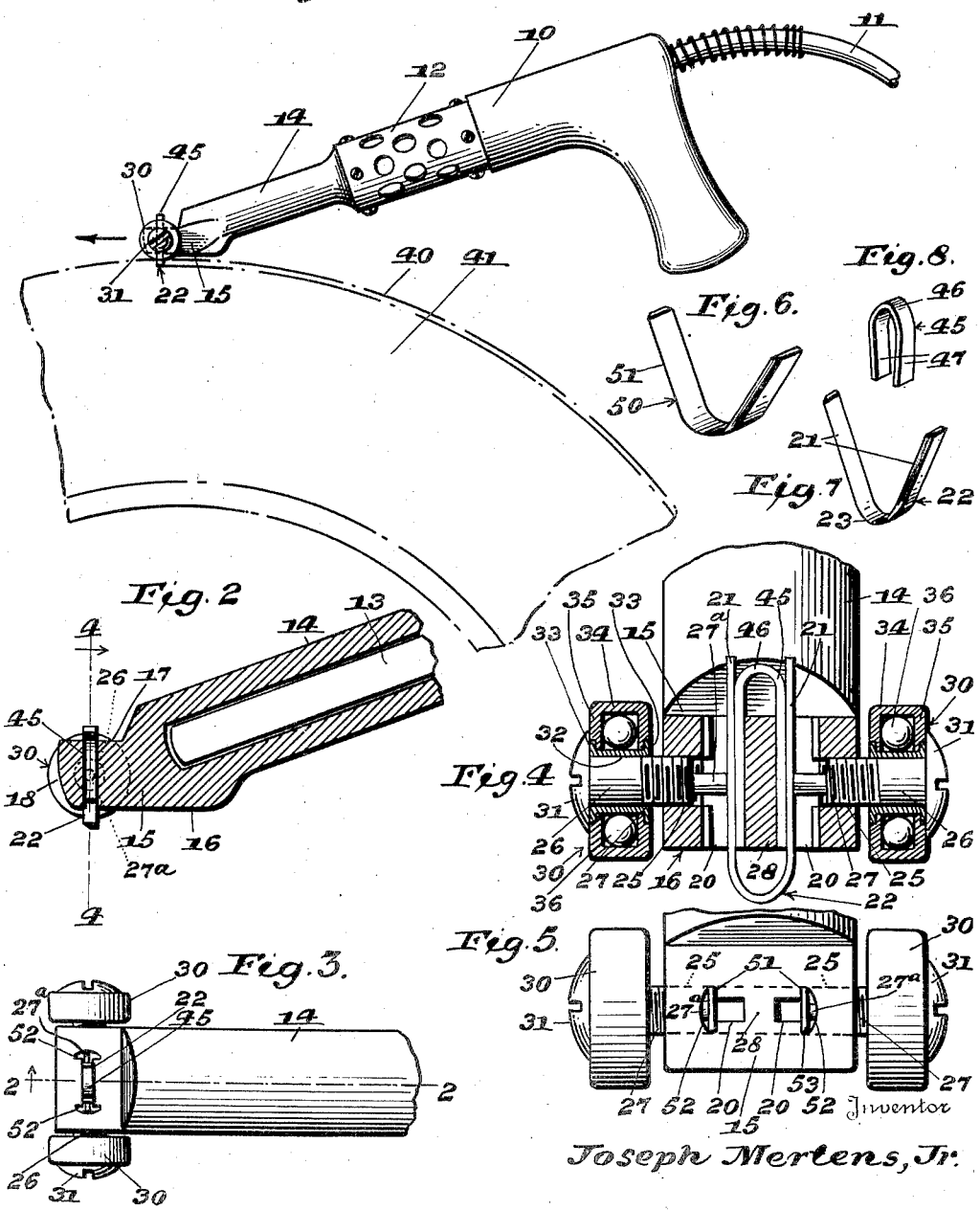
Inventor
Joseph Mertens, Jr.
By Nunn, Anderson & Liddy
Attorneys Patented Jan. 28, 1941

2,230,042

UNITED STATES PATENT OFFICE 2,230,042

TIRE GROOVING TOOL

Joseph William Mertens, Jr., Racine, Wis.

Application February 8, 1940, Serial No. 317,973

5 Claims. (Cl. 30—140)

This invention relates to a device for forming grooves in the outer face of automobile tire casings after the original treads of the tire have been worn smooth.

It has been proposed to provide tools of various types having some form of cutter which may be forced along the surface of the tire for forming grooves therein. These devices, however, have flat surfaces or shoes which rest on the casing as the tool is being forced in cutting relation with the surface of the tire. Due to the fact, however, that the greater majority of these casings contain foreign matter in the form of grease, tar or oils, the underface of the tool collects the tar and other sticky matter when the heated tool is moved over the surface. This foreign matter on the bottom of the face of the tool in connection with the foreign matter on the casing creates considerable friction so that not only the work of regrooving is handicapped but the actuation of the tool is very tiresome to the operator.

It has also been proposed to provide guides for maintaining the cutting head away from the surface and these guides are so constructed that they are adapted to be moved in a groove in the tire. However, where the tire is badly worn there are no grooves left to use the guide and therefore the same becomes not only useless but acts as a hindrance to the actuation of the tool because a definite path cannot be maintained by the operator and the end of the guide becomes clogged with foreign matter.

It is an object of the present invention to provide a tool for forming grooves in tires in which the grooving head is not only supported outwardly of the surface of the tread of the tire but the head may be readily rolled along the surface without any friction.

Another object of the invention is the provision of a grooving tool which is adapted to support a U-shaped groove cutting member with threaded axles acting as clamps for securing the cutters in position, the axles also carrying frictionless wheels so that the tool may be readily moved over the surface while the bottom of the head of the tool is maintained out of contact with the surface of the tire.

A further object of the invention is the provision of a tool for forming grooves in the treads of tires after the original treads have been worn down, the tool including a cutter head having relatively wide and spaced slots in the head to receive the legs of U-shaped cutter, the slots being of such a width that the legs of inverted U-shaped members may be inserted between the legs of the cutter and the outer walls of the spaced slot for causing the cutter to be expanded when it is clamped in position on the head.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view of my grooving tool shown applied in operative relation with a tire, Figure 2 is a fragmentary vertical section taken along the line 2—2 of Fig. 3, Figure 3 is an enlarged fragmentary plan view of a head showing the cutter in position, Figure 4 is a vertical section taken along the line 4—4 of Fig. 2, Figure 5 is a fragmentary enlarged plan view showing the application of the largest type of cutter employed, Figure 6 is a view in perspective of a large blade for forming grooves in truck tires, Figure 7 is a view in perspective of a small blade for forming grooves in tires of passenger cars, and Figure 8 is a view in perspective of a cutter expanding member employed with the cutter shown in Figs. 1 and 7.

Referring more particularly to the drawing, 10 designates a handle from which projects an electric cord 11 which has the usual plug (not shown) for connecting the device with the house current. A perforated metal cylinder 12 embraces the inner end of a heating unit 13 which extends down to a barrel 14 that is connected to the handle 10 by means of said cylinder. A head 15 is formed integrally with the outer end of the barrel 14.

The head consists of a solid piece of metal which has a flat smooth bottom portion 16 and a top portion 17 which is of considerably less length than the bottom 16. The front end 18 of the head is rounded and the entire head may be highly polished or it may be coated with chromium or any other suitable material. Since the head 15 is a continuation of the barrel 14, the barrel likewise has a polished surface.

The barrel is provided with a pair of spaced vertical slots 20 and it will be noted from Fig. 4 that these slots are considerably wider than the thickness of legs 21 of a cutter 22 which is made of resilient material such as steel. The outer edge of the cutter, as shown at 23, is sharpened.

A pair of transverse passages 25 extend inwardly from the side walls and open into the vertical slots 20.

An axle 26 has a threaded portion 27 screwed into the respectively threaded passages 25 and a reduced portion 27a projects into the vertical slots 20 for clamping the legs 21 of the cutter against the inner side walls of the slots which are formed by a bridging member 28 located between the vertical slots.

A roller or wheel 30 is located upon the outer end of each axle 26 and a head 31 on the outer end of each axle engages the outer face of the wheel for maintaining the wheels on the axles.

Each wheel, as shown more particularly in Fig. 4, is specially constructed and comprises a ring 32 having outstanding annular flanges 33 at the peripheries of the ring and a second ring 34 is held in spaced relation with the ring 32 by means of spaced flanges 35, these flanges housing a series of balls 36. Thus it will be seen that the ring 32 is forced tight upon the respective axle 26 while the rings 34 through their flanges 35 revolve on the rings 32. The diameter of the wheels or rollers 30 are such that they will maintain the bottom face 16 of the head 15 out of contact with the tread 40 of a tire casing 41 (Fig. 1). The cutter 22, however, extends below the bottom face 16 of the head 15 so that it will cut a groove of proper depth in the tread.

When it is desired to expand the cutter 22 to produce a groove of a wider diameter than is made ordinarily by the cutter an inverted U-shaped member, generally designated by the numeral 45, has its legs inserted within the vertical slots 20 with the bight portion 46 of the member being located above the upper face 17 of the head 15. The legs 47 of the member 45 are placed in the position shown in Fig. 4 and in flat contact with the inner walls of the slots 20. The legs 21 of the cutter 22 are located outwardly so that when the axles 23 are screwed into the threaded passages 25 the reduced ends 27 of these axles will engage the legs 21 of the cutter 22 and clamp not only the legs 21 but the legs 47 of the member 45. With an inverted U-shaped member having greater thickness than that shown in Fig. 4 the cutter 22 can be expanded to a greater degree while thinner legs will cause a less expansion of the cutter. This is particularly important where it is necessary in certain threads to produce grooves of a greater width than other grooves and this is done by the simple expedient of placing the vertical U-shaped member 45 in the slots 20.

As shown in Figs. 5 and 6 a cutter 50 of greater width than the cutter shown in Figs. 4 and 7 is employed and these cutters are used for the purpose of forming wide grooves in tires for trucks, etc. In this case the legs 51 of the cutter 50 are inserted through vertical slots 52. When the axles 26 are screwed into the passages 25 the reduced ends 27a of the axles will engage the legs 51 of the cutter 50 and clamp it against shoulders 53 which are located at the outer ends of the slots 20.

The operation of the tool is as follows: The wires 11 are connected to the usual house current and when the heating element 13 has raised the temperature of the head 15 sufficiently the tool is ready for operation. It is then placed upon the outer face of the casing and pushed forwardly in the direction indicated by the arrow shown in Fig. 1. It will be seen that the bottom face 16 of the head 15 is maintained above or outwardly of the outer face 40 of the casing 41 by the rollers or wheels 30. Due to the fact that these wheels are provided with frictionless bearings the tool may be easily moved over the surface of the tire so that all resistance between the bottom face 16 of the head 15 and the outer face of the casing 41 is eliminated.

It will be noted that the lower ends of the legs 47 of the U-shaped member 45 are always flush with the bottom face 16 of the head 15 so that these legs will not interfere with the cutting operation of the member 22.

This type of construction will require only about 50% of the power necessary for forcing tools of other types along the surface of the tire. While the heat of the head will melt the tar and oil which have collected on the outer surface of the tire, nevertheless, the bottom face 16 of the head 15 will be out of contact with the foreign matter. The wheels, however, are mounted to give little friction so that any tar or grease which will collect on the tire will not interfere with the ease or facility of operating the tool.

To obtain maximum efficiency in those types of tools which are provided with a head for sliding over the surface, it is necessary to stop the work at times and scrape the foreign matter which has been collected by the bottom face and which has been compactly caked upon the lower face of the head.

I claim:

1. A tire groover comprising a handle, a cutting head projecting from the handle and provided with spaced vertical slots and threaded horizontal passages, a U-shaped cutter having the legs thereof received by the slots, threaded axles secured into the passages and clamping the legs against movement, and wheels on the axles for supporting the head above the surface of the tire being grooved.

2. A tire groover comprising a handle, a cutting head projecting from the handle and provided with threaded transverse passages and spaced vertical slots, a U-shaped cutter having the legs thereof received by the slots, an inverted U-shaped member having the legs thereof received by the slots and engaging the inner faces of the legs of the cutter for expanding the cutter, and threaded axles screwed into the passages for clamping the legs of the U-shaped members against movement.

3. A tire groover comprising a handle, a cutting head projecting from the handle and provided with threaded transverse passages and spaced vertical slots, a U-shaped cutter having the legs thereof received by the slots, an inverted U-shaped member having the legs thereof received by the slots and engaging the inner faces of the legs of the cutter for expanding the cutter, threaded axles screwed into the passages for clamping the legs of the U-shaped members against movement, and rollers on the axles for supporting the head above the surfacing of the tire and for eliminating friction between the bottom of the head and the tire being grooved.

4. A tire groover comprising a handle, a cutting head projecting from the handle and provided with spaced vertical slots, a U-shaped cutter formed of resilient material and having the legs thereof received by the slots, the width of the slots being greater than the thickness of the legs so that the legs may be moved towards or away from each other, an inverted U-shaped member having the legs thereof received by the slots and inwardly of the legs of the cutter for spreading said legs of the cutter farther apart and for expanding the cutter and clamping means in the head for forcing the legs of the cutter and inverted U-shaped member against the inner walls of the slot.

5. In a tire groover, a cutting head having spaced vertical slots therein and provided with threaded transverse passages opening into the slots, a U-shaped cutter having the legs thereof received by the vertical slots, threaded axles screwed into the passages and having the inner ends thereof projecting into the slots and clamping the legs of the cutter against the inner walls of said slots, and rollers mounted on the outer ends of the axles.

JOSEPH WILLIAM MERTENS.